A. F. DICKEY.
LOCK NUT.
APPLICATION FILED OCT. 21, 1912.

1,086,655.

Patented Feb. 10, 1914.

Witnesses

A. F. Dickey, Inventor
by C. A. Snow & Co., Attorneys

UNITED STATES PATENT OFFICE.

AARON F. DICKEY, OF SOMERSET, PENNSYLVANIA.

LOCK-NUT.

1,086,655.   Specification of Letters Patent.   Patented Feb. 10, 1914.

Application filed October 21, 1912. Serial No. 727,033.

*To all whom it may concern:*

Be it known that I, AARON F. DICKEY, a citizen of the United States, residing at Somerset, in the county of Somerset and State of Pennsylvania, have invented a new and useful Lock-Nut, of which the following is a specification.

The present invention appertains to lock nuts, and aims to provide a nut of utmost simplicity which shall be designed to be readily locked upon a grooved bolt, the nut being complete in itself and not being encumbered by any attachments.

To the above and other ends, the present invention resides essentially in forming the outer face of the nut in such a manner as to provide an annular beveled lip or edge about the bolt, which lip or edge is malleable and is designed to be punched into the groove of the bolt over a key driven into the groove within the nut.

The present invention also resides in other details of construction that will hereinafter fully appear, reference being had to the accompanying drawing wherein the preferred embodiments of the present invention have been illustrated, and wherein:—

Figure 1:
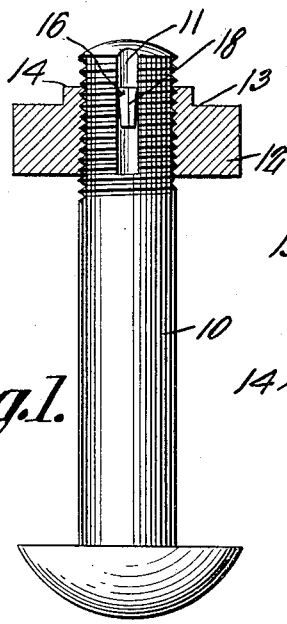
Figure 2:
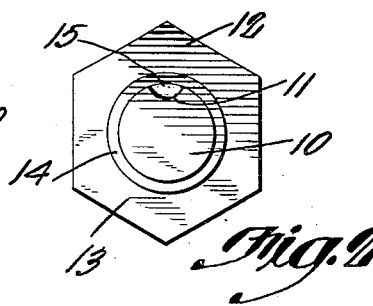
Figure 3:
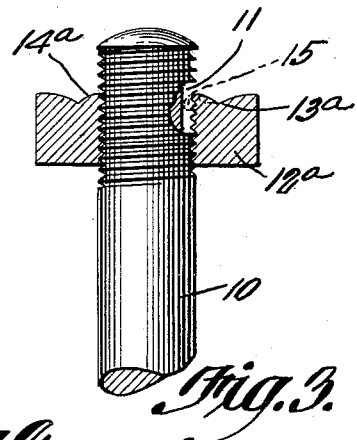
Figure 7:
Figure 4:
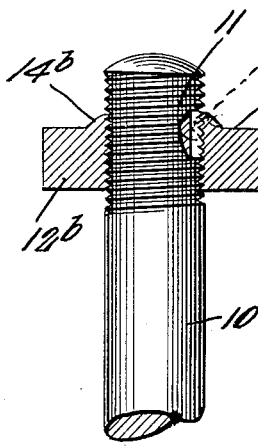
Figure 5:
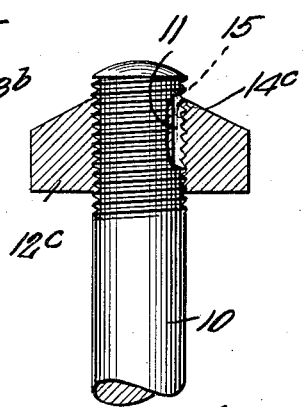
Figure 6:
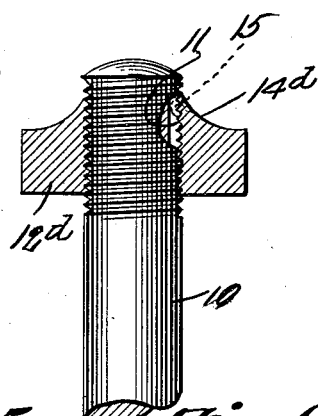

Figure 1 is an elevation of a bolt with the nut applied thereto, the nut being shown in section. Fig. 2 is an end elevation thereof. Fig. 3 is an elevation of a fragmental portion of a bolt, showing another form of nut applied thereto, the nut being shown in section. Figs. 4, 5 and 6 are views similar to Fig. 3 illustrating other variations of the nut. Fig. 7 is a perspective view of a key which may be employed for permanently locking the nut on the bolt.

Referring specifically to the drawing, wherein similar reference characters have been employed to denote corresponding parts, the numeral 10 designates the bolt, which may be of any suitable construction, and which is provided with a longitudinal concaved groove 11. In connection with this grooved bolt, there is employed a novel form of nut, which may be of various configurations, as hereinafter described in connection with the several figures, and a key adapted to be driven into the groove of the bolt within the nut, the nut having a portion adapted to be driven into the groove to retain the key in position and to assist in locking the nut against rotation on the bolt. The several forms of nuts will be independently described, and after these detailed descriptions, the use of the key with the general type of nut, will be described.

The nut illustrated in Figs. 1 and 2, has been designated by the numeral 12, and is of the usual construction with the exception of the peculiar configuration of the outer face thereof, which has its marginal or peripheral portion cut away, as designated by the numeral 13, to provide an annular sharp lip 14 about the bolt. This lip 14 is malleable, in order that when the nut has been screwed sufficiently upon the bolt, the edge of the lip 14 lying over the groove 11 may be struck inwardly, as is designated by the numeral 15 in Fig. 2, by means of a suitable punch, or other implement, in order to engage the groove 11 of the bolt for constraining the nut against turning or removal.

In the form shown in Fig. 3, the outer face of the nut $12^a$ is provided with an annular shallow V-shaped groove $13^a$ forming an annular beveled lip $14^a$ about the bolt, the said lip being malleable and the edge thereof being designed to be punched into the groove 11 of the bolt, as designated at 15. This form of the nut is highly preferable for the reason that those portions at the outer and inner edges of the annular groove lie in the same plane, so that a washer, an additional bolt, or any other object may bear against the outer face of the nut in a convenient and efficient manner.

The nut $12^b$ shown in Fig. 4 is similar to the nut shown in Fig. 3, with the exception that the marginal or peripheral portion of the outer face of the nut is completely cut away, as designated by the numeral $13^b$ to provide the beveled lip $14^b$ around the bolt.

The variation of the nut $12^c$ as illustrated in Fig. 5, is such, that the outer face of the nut is conical or beveled from the bolt to the periphery or margin, as designated by the numeral $14^c$, so as to provide a malleable edge about the bolt.

The nut $12^d$ illustrated in Fig. 6, is somewhat similar to the nut illustrated in Fig. 5, with the exception that the outer face of the nut is conoidal or is concaved as designated by the numeral $14^d$, thus providing a malleable edge designed to be punched into the groove of the bolt.

Thus, with each form of nut, there is provided a malleable edge or lip, which is designed to be punched into engagement with the groove of the bolt for locking the nut against displacement. The forms of the nut illustrated in Figs. 3 to 6, inclusive, are preferable, for the reason that the face of the lip is beveled, so that the punch or other implement may be brought against the edge in a convenient manner, or at an angular position relative to the axis of the bolt. The form of nuts depicted in Figs. 3 to 6, inclusive, are also of peculiar advantage, for the reason that it is frequently impossible to position the punch or implement at an angle to the bolt so that with the present nuts, the implement may be inserted or driven longitudinally inward along the groove in the bolt so as to engage the sharp malleable edge and thus punch the same into the groove. This feature can only be provided by having the outer face of the nut beveled around the bolt to provide a malleable edge about the bolt, so that this feature is not present with the nut disclosed in Fig. 1. When the edge of either form of the nut is engaged within the groove of the bolt, the nut may be removed by applying a sufficient torsional strain to the nut, by means of a wrench or the like, so that the instruck portion will be raised to pass over the thread of the bolt. The instruck portion of the nut, however, will be sufficiently rigid to prevent accidental displacement of the nut, under the various conditions to which the bolt and nut may be subjected.

To permanently lock the nut on the bolt, it being understood that this refers to any one of the forms of nuts above described, a key, such as illustrated in Fig. 7 may be employed, the same having one face convexed as designated by the numeral 17, and having its other face V-shaped to provide a cutting edge 18. After the nut has been sufficiently run onto the bolt, the wedge 16 may be inserted into the groove 11 of the bolt, the convex face 17 engaging the groove, which is concaved, and the wedge or key may then be driven within the nut by means of a hammer or other suitable implement, the edge 18 cutting into the threads of the nut so as to practically prevent the removal of the nut (see Fig. 3.) After the key has been driven into the nut, the malleable edge may be punched into the groove of the bolt as above indicated, so that the key may be locked in position by that portion of the malleable edge punched in the groove. Thus, the key and malleable edge may be jointly employed for permanently locking the nut on the bolt in a novel manner.

The variations of the nut, as illustrated and described, each serve to carry out the object aimed at in a satisfactory manner, it being noted that the nuts are not provided with any attachments and are complete in themselves, the nuts being constructed entirely by the peculiar figuration or formation of its outer face and the nut being tapped from face to face. The outer faces of the nuts may be formed as described and illustrated by turning the same upon a lathe, or in any other suitable manner which will be apparent to the artisan or mechanic.

Having thus described the invention what is claimed as new is:—

In combination with a bolt having a longitudinal groove, a nut threaded thereon and having its outer face so formed as to provide a malleable edge about the bolt designed to be punched into the groove, and a key adapted to be driven into the groove so as to cut into the threads of the nut, the key being designed to be locked in position by that portion of the malleable edge punched into the groove.

In testimony that I claim the foregoing as my own, I have hereto affixed my signature in the presence of two witnesses.

AARON F. DICKEY.

Witnesses:
G. C. WINSLOW,
CLARENCE L. SHAVER.

---

Copies of this patent may be obtained for five cents each, by addressing the "Commissioner of Patents, Washington, D. C."